Aug. 16, 1966  R. J. GERES  3,266,294
HYBRID IMPULSE BOMB
Filed July 6, 1964  4 Sheets-Sheet 1

*INVENTOR.*
ROBERT J. GERES
BY
*P. H. Firsht*
ATTORNEY.

Aug. 16, 1966  R. J. GERES  3,266,294
HYBRID IMPULSE BOMB
Filed July 6, 1964  4 Sheets-Sheet 2
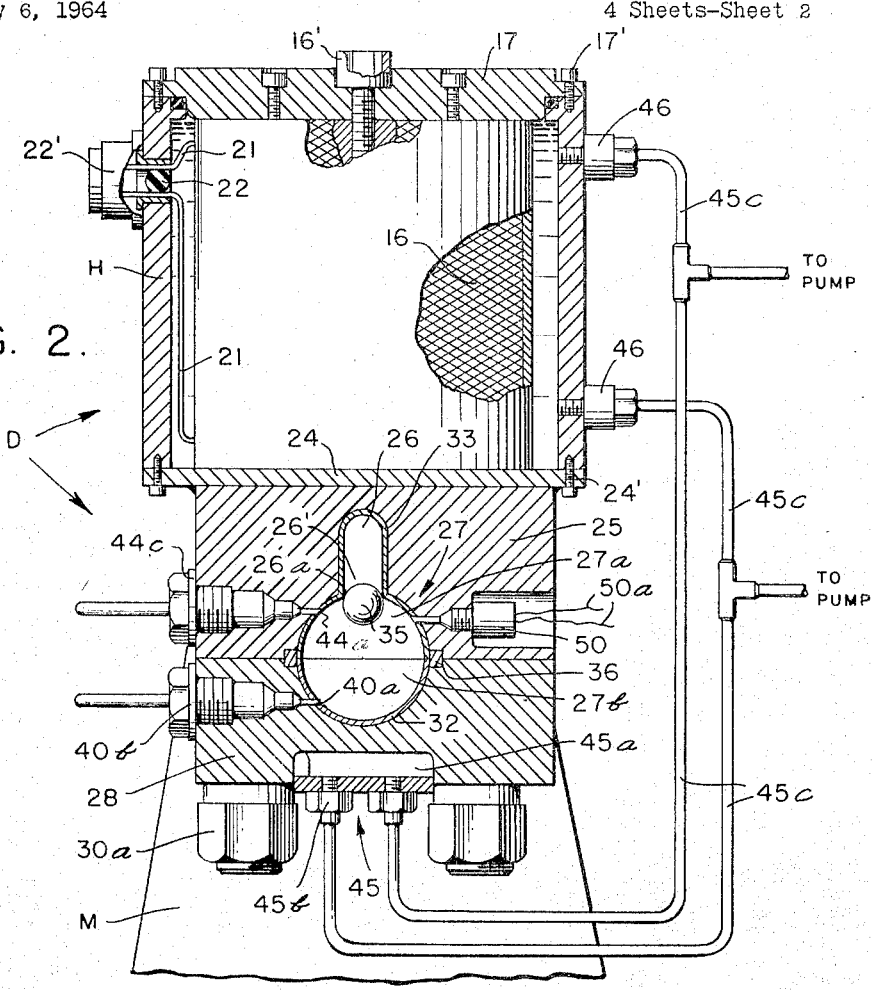
FIG. 2.
FIG. 7.  FIG. 8.
*INVENTOR.*
ROBERT J. GERES
BY
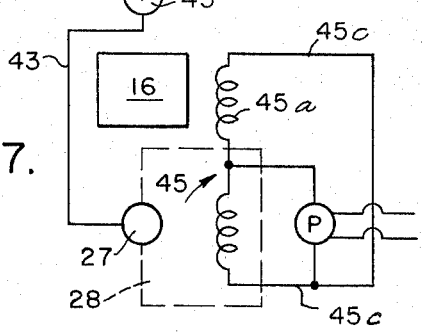
ATTORNEY.

Aug. 16, 1966  R. J. GERES  3,266,294
HYBRID IMPULSE BOMB

Filed July 6, 1964  4 Sheets-Sheet 3

INVENTOR.
ROBERT J. GERES
BY
P. H. Firsht
ATTORNEY.

INVENTOR.
ROBERT J. GERES
BY
P. H. Firsht
ATTORNEY.

United States Patent Office 3,266,294
Patented August 16, 1966

3,266,294
HYBRID IMPULSE BOMB
Robert J. Geres, China Lake, Calif., assignor to the United States of America, as represented by the Secretary of the Navy
Filed July 6, 1964, Ser. No. 380,716
7 Claims. (Cl. 73—35)

The invention described herein may be manufactured and used by or for the Government of the United States of America for governmental purposes without the payment of any royalties thereon or therefor.

This invention relates generally to bipropellant evaluating devices and more particularly to a hybrid propellant test vessel, which may be referred to as a hybrid impulse bomb, for evaluating propellant performance in terms of maximum pressures obtainable therefrom.

In bipropellant systems, the fuel and the oxidizer are stored separately with mixing taking place in a combustion chamber. Where ignition occurs spontaneously, as the fuel and the oxidizer is mixed, the resulting propellant is often classified as hypergolic in order to distinguish it from those bipropellants which are not self-igniting.

Several devices, or impulse bombs, presently exist for testing and evaluating miscible bipropellants. However, those working in the field of propellants have found the known systems to be completely unsatisfactory for evaluating those hybrid propellants, which are hypergolic in nature and comprise highly reactive, and sometimes toxic, ingredients. In the past hybrid propellant evaluation has been accomplished through test firing selected propellants in full scale static rocket engines. This mode of evaluating propellants is undesirably expensive, dangerous and time consuming as it necessitates fabrication, test firing and result evaluation of large quantities of propellant ingredients.

Therefore, the purpose of the instant invention is to provide a constant volume propellant test system for evaluating the performance of advanced propellants, both hybrid and tribrid, before they are actually fabricated into usable rocket propellant systems, in order to establish correlations with theoretical performances obtained from thermochemical calculations.

An object of the present invention is to provide a simple, safe and economical propellant testing device.

Another object is to provide in a hypergolic propellant mixing system a simple, highly-reliable and selectively operable mixing-valve for a completely sealed combustion chamber.

Yet a further object is to provide a system for maximizing the transfer of liquid propellant ingredients from storage containers to a test chamber.

Still a further object is to provide a propellant testing system which may be readily converted to test hypergolic propellants having more than two propellant ingredients.

Other objects, advantages and novel features of the invention will become apparent from the following detailed description of the invention when considered in conjunction with the accompanying drawings wherein:

FIG. 1 comprises an over-all perspective view of the device of the instant invention disposed in an erected test-firing disposition;

FIG. 2 is a partial cross-sectioned view taken generally along lines 2—2 of FIG. 1;

FIG. 7 is a schematic view of the thermal siphon system utilized by the present invention;

FIG. 8 is a schematic view of the magnetic coil circuit as provided in the device of the instant invention.

Briefly, the device of the present invention comprises a device including a first chamber communicating with a second chamber, a ball-and-seat mixing valve arranged therebetween, and a device for measuring pressures developed in the chambers as the igniter and fuel are mixed to cause a spontaneous combustion. A solid ingredient is first deposited in the second chamber, hereinafter referred to as the secondary chamber, a ball seal is next seated within the opening of the secondary chamber and retained therein by an electromagnet. The first chamber, hereinafter referred to as primary chamber, is sealed and inverted so that liquid ingredient may now be deposited in the primary chamber, which is then pressure-sealed by means of a needle-valve. The device is "fired" by de-energizing the electromagnet so that the ball may drop from its seat, agitate the liquid and permit the solid to drop into contact with the liquid, whereupon a spontaneous ignition occurs. The pressures developed within the primary chamber are now measured through a pressure transducer communicating with the primary chamber.

Figure 1:
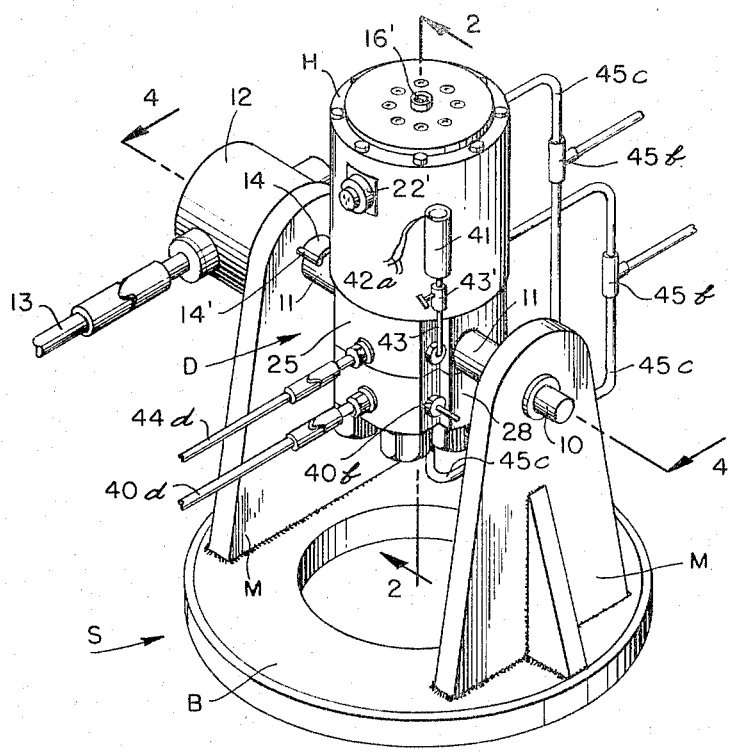
Figure 4:
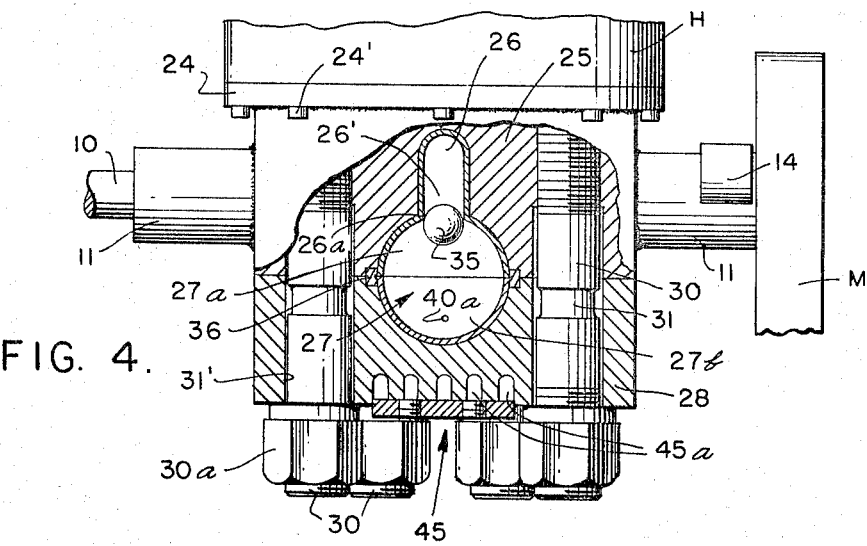
FIG. 4 is a partial cross-sectioned view taken generally along lines 4—4 of FIG. 1.

Turning now to the drawings wherein like reference characters designate like or corresponding parts throughout the several views, there is shown in FIG. 1 the test device D of the instant invention. The device D is supported by a horizontally disposed, portable stand S including a base B having fixed thereto a pair of upright support members M. Each support member M has provided therein an opening for receiving a journal 10 which is coupled to device-attached support shafts 11 extending laterally from the sides of the device D to provide a trunnion, whereby the device D is supported by the members M and shafts 11 for end-to-end rotation between the members M.

As the device D must from time-to-time be rotated relative to the stand S, for reasons as will hereinafter be more clearly understood, a conventional gear train (not shown) is coupled with one of the shafts 11 within a gearbox 12 mounted on one of the members M. The gear train serves to rotate the shaft 11, and consequently, the device D. The gear train is provided with a selectively driven drive-shaft 13, which extends away from the device D for accommodating remote control to drive the device D to a preselected vertical disposition. In order to retain the device D in a vertical disposition a convention dog 14 is fixed to one of the shafts 11 to operatively abut a fixed stop pin 14' mounted on the adjacent member M.

Turning now to FIG. 2, the device D is provided with a cylindrical housing H in which is disposed an inductance coil and core for an electromagnet 16. The electromagnet 16 is secured in place by a threaded pin 16' passing through a housing cover plate 17 secured to the housing H by screws 17'. The electromagnet 16 may be of any suitable design, such as, for example, a cup core, and is connected to a source of alternating current 20, FIG. 8, by means of leads 21, including a normally operative circuit switch 21', which may be closed and opened to selectively energize and de-energize the electromagnet 16. The leads 21 extend through a sealing plug 22 mounted in the wall of the housing H and, if desired, a conventional junction box 22' may be mounted on the housing H for providing a junction connection within the leads 21. Further, as a safety measure, a small neon lamp 23, FIG. 8, may be connected in circuit series with the switch 21' so that an operator may be constantly aware of the state of energization of the electromagnet 16.

The end of the cylindrical housing H opposite the cover plate 17 is closed by means of a bottom plate 24 fixed to the housing H by threaded screws 24'. Suspended from the bottom plate is a primary head or block 25 which may be secured to the plate 24 in any suitable manner, such as, for example, by welding.

The head 25 is machined near its center to provide a tubular secondary chamber 26 which extends vertically toward the plate 24 and terminates near the uppermost surface of block or head 25, FIG. 2, to establish the secondary chamber with a conduit portion 26' being formed at its lowermost end. Thus the chamber 26 and conduit 26' define a void of a predetermined volume. The conduit portion 26' of chamber 26 opens at a juncture port 26a into a relieved portion 27a of the block 25. The portion 27a is of hemispheric configuration and forms one-half of the spheric primary chamber 27. Chamber 27 defines a void of a predetermined volume and is established by mating a hemispheric relieved portion 27b of a secondary head or block 28 with the head 25.

Figure 3:
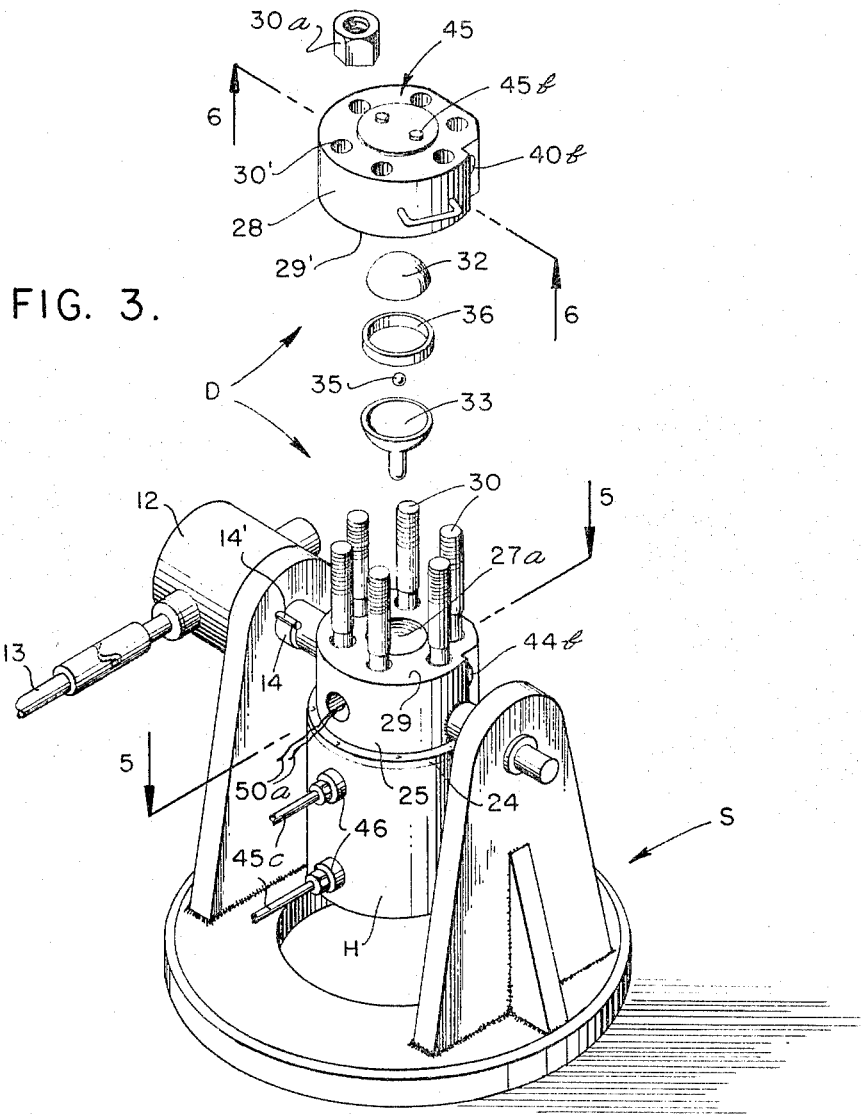
FIG. 3 is a partially exploded perspective view of the device disposed in an inverted fuel charging disposition.

The heads 25 and 28 are provided with machined mating surfaces 29 and 29', FIG. 3, which permit the two heads to be mated for establishing a sealed condition for the chamber 27. In order to mate the heads 25 and 28, a plurality of threaded stud-bolts 30 are threaded into the primary head 25 and arranged to extend through holes 30' drilled through the secondary head or block 28. Each stud-bolt 30 is provided with a nut 30a so that the hemispheric chamber 27b of the head 28 may be mounted contiguous with the chamber 27a of the primary head 25 to establish the spheric primary chamber 27. The chamber 27 is sealed by torquing nuts 30a for drawing the stud-bolts 30 through the secondary head or block 28. As a practical matter, it may be found desirable to provide a relieved portion 31 about the circumference of each of the stud-bolts 30 so that the stud-bolts may fail in the event the chamber 27 is pressurized to a predetermined magnitude, and permit the heads 25 and 28 to part.

Each of the chambers 26 and 27 is provided with a removable liner formed of a highly polished material, such as stainless steel, for example, which tends to reduce heat loss from the chambers and prevent the occurrence of a chemical reaction between the propellant and the chamber walls. Further, the fact that the liners are removable accommodates a replacement thereof after each test-firing. As more clearly shown in FIG. 3, the liner for the chambers comprises two sections 32 and 33. Section 32 is formed as a hemisphere, while the section 33 is formed as a hemisphere having an integral, elongated portion extending from the circumference thereof so that the liner section for each block or head may be inserted therein as a unitary member.

The portion of the liner section 33, which comprises a liner for the port 26a, provides a seat for a highly polished spherical sealing member or ball 35. The ball 35 is formed of a ferrous material having high permeability to provide a ferromagnetic sealing member through which lines of magnetic flux may be passed for drawing the ball 35 toward the port 26 for thus causing the ball to seat for establishing a seal between the highly polished surface of the liner and the surface of the ball 35.

In order to insure that very high pressures (25,000–50,000 p.s.i.) may be maintained within the chamber 27, a ring seal or gasket 36 may be provided and seated in appropriate grooves (not designated) formed in the surfaces 29 and 29' and about the chamber portions 27a and 27b.

Figure 6:
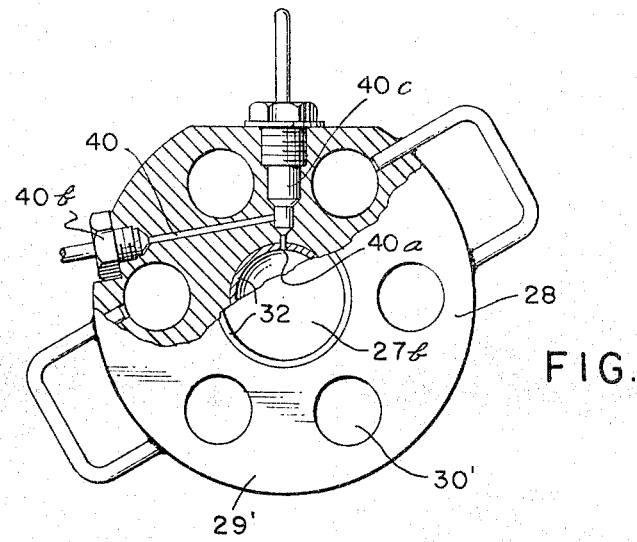
FIG. 6 is a cross-sectioned view taken along lines 6—6 of FIG. 3.

Before each test-firing the sealed chamber 27 is purged and filled with an inert gas, such as Argon for example. This is effected through an exhaust passage or conduit 40, FIG. 6. The conduit 40 extends from a port 40a formed in the chamber portions 27b, through the block 28 and terminates at a fitting 40b threaded in to the block. The fitting 40b is of any suitable design dictated by the coupling utilized for connecting the conduit with a conventional purge-exhaust complex (not shown). Since purge and exhaust complexes, or systems, are well-known, a detailed description thereof is omitted in the interest of brevity. However, it is to be understood that the purge-exhaust complex used must be capable of alternately pressurizing the chamber 27 and then "bleeding" off the established pressures while excluding ambient atmosphere.

In order to seal the exhaust conduit 40 relative to the chamber 27, a conventional needle valve unit 40c is threaded into the block 28 with the needle thereof being adapted to be tightened into a sealing relationship with the port 40a by means of an externally coupled torque applying shaft 40d, FIG. 1. The shaft 40d accommodates a remote manipulation of the needle valve 40c for selectively opening and sealing the port 40a.

Charging of the device D is accomplished by injecting a liquid ingredient into the chamber 27 by means of a thermal siphon system. The siphon system is provided with an ampule retainer unit 41 including an ampule receiver 41a, as schematically shown in FIG. 7, which receives an ampule of liquid ingredient to be injected into the chamber 27.

Figure 5:
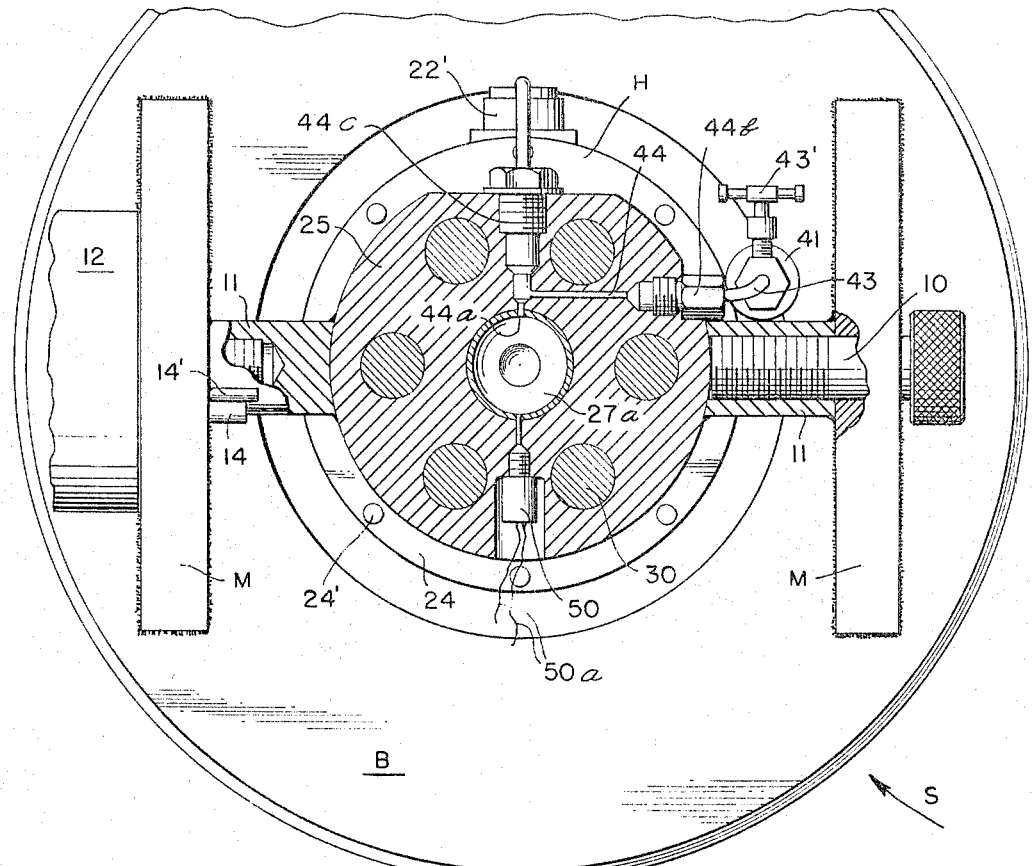
FIG. 5 is a cross-sectioned view taken along lines 5—5 of FIG. 3.

The ampule receiver 41a is of any suitable design which receives and opens an ampule as it is inserted and coupled therein. However, it is to be particularly noted that where propellant ingredients are to be evaluated, it is necessary to control, as nearly as possible, the amount of injected liquid. Therefore, an electrical resistance heating unit 42 may be mounted within the unit 41 adjacent the receiver 41a and coupled to a source of potential S through leads 42a and switch 42b for heating the liquid above its boiling point. Through heating, the liquid is caused to undergo a phase change and pass as vapor from an inserted ampule through a suitable connecting tube 43 into a charging conduit 44, FIG. 5, formed in the primary head 25, and into the chamber 27 through a port 44a. As a practical matter, the tube 43 may be provided with an on-off valve 43' for selectively releasing the liquid for passage to the conduit 44.

The tube 43 is coupled between the retainer unit 41 and the conduit 44 by means of a low-pressure coupling 44b, of conventional design, threaded into the block or head 25. A conventional needle valve unit 44c, of a design similar to that of needle valve unit 40b, is threaded into the block 25 with the needle thereof being adapted to be extended and retracted by means of an externally coupled shaft 44d, FIG. 1, driven in a manner similar to shaft 40d, for selectively sealing the chamber 27 relative to the conduit 44.

A cooling unit 45, FIGS. 2 and 7, is provided in the base of the block or head 28. The unit 45 includes conventional cooling coils 45a coupled to a liquid coolant circulating system, as schematically illustrated in FIG. 7, through a pair of "quick-disconnect" couplings 45b, of any well-known design, connected with inlet and outlet lines 45c, which serve to continuously circulate a suitable liquid coolant through the unit 45. The coolant serves to cool the chamber 27 and initiates a second phase change in the ingredient being injected into the chamber 27 by converting it from a vapor back to a liquid. Hence, it is readily apparent that a maximum discharge of the ingredient from an ampule may be effected by the thermal siphon system, which first converts the liquid to a vapor or gas within the ampule, thus causing a pressure increase therein for forcing the ingredient from the ampule, and subsequently converts the vapor back to a liquid within the chamber 27 causing a pressure decrease to occur within the chamber for thus effectively siphoning the ingredient from the ampule retained in the ampule retainer unit 41.

In operation, the electromagnet 16 will tend to become heated during periods of energization, therefore, the coolant system 45 is also connected with the housing H through lines 45c and suitable "quick-disconnect" fittings 46 for circulating the coolant therethrough and about the magnet 16 to thus cool the electromagnet during operation.

Mounted to communicate with the chamber 27 is a quartz crystal transducer 50 threaded into the block 25 for monitoring the pressures developed as combustion occurs within the chamber. While the design of the transducer may be varied, the quartz crystal transducer has been found to be particularly desirable because of its high linearity and repeatability over an extremely wide range of pressures and its uniform charge sensitivity from very low to very high temperatures. Further, the natural frequency of the quartz crystal allows measurement of fast pressure rise-times encountered in operation of the device. Leads 50a are provided to extend from the transducer 50 to a suitable recording device (not shown).

In order to prepare for a test-firing, the shafts 40d and 44d, and the lines 45c are disconnected from device D, whereupon it is inverted relative to the base B, e.g., rotated from its firing position, illustrated in FIG. 1, to a first charging disposition, depicted in FIG. 3, through a driving of the shaft 13. The head or block 28 is then removed subsequent to a removal of the nuts 30a. The liner portions 32 and 33 and gasket 36 are next inserted into the blocks 25 and 28. An accurately measured quantity of solid propellant ingredient is now inserted into chamber 26 and the ball 35 seated in the port 26a. The switch 21' may now be closed for effecting an energization of the electromagnet 16 for thus drawing the ball 35 against the seat to establish a seal between the chambers 26 and 27. As the switch 21' is closed, the indicator lamp 23 is caused to light. The heads 25 and 28 are next mated and pressure sealed by drawing the stud-bolts through the block 28 through applying appropriate torque to the nuts 30a.

With the ball 35 retained on its seat under the influence of the electromagnet 16, the shaft 13 is driven in a reverse direction for again rotating the device D relative to its base B for disposing it in its firing disposition as the dog 14 comes into stopping engagement with the stop pin 14'. The lines 45c may now be connected to the device. A suitable purge-exhaust complex is connected at the fitting 40b. The port 40a is now opened, whereupon the chamber 27 may be purged using an inert gas. After the chamber 27 is purged, the needle of the needle valve unit 40c is seated at the port 40a to seal the chamber 27. Next an ampule of liquid propellant ingredient is inserted into the ampule retainer unit 41 causing the ampule to be opened. With the valve 43' closed, the switch 42b is closed, causing the resistance unit 42 to heat the ingredient for initiating a phase change in the ingredient contained in the ampule. The needle of the needle valve unit 44c may now be displaced from the port 44a, and the valve 43' turned on, whereupon the ingredient, now a gas, is forced from the ampule into the chamber 27 and cooled to again assume a liquid state. After there has been a maximum charging of the chamber 27, the needle of the needle valve unit 44c is seated within the port 44a to completely seal the chamber 27.

With the device D thus charged, it may be fired simply by opening switch 21', which causes a de-energization of the electromagnet 16 and a collapse of its magnetic field to occur. When this collapse occurs, the ball 35 is dropped from its seat into the liquid causing an agitation thereof. As the ball 35 drops from its seat the port 26a is opened, whereby the solid propellant ingredient in chamber 26 is free to drop into the liquid retained in the chamber 27. Once the two ingredients come together, there is a spontaneous ignition of the propellant causing a pressure rise to occur in the chambers. These pressures are detected by the transducer 50 and may be recorded in any suitable manner to provide a basis for evaluating the propellant ingredients.

Figure 9:
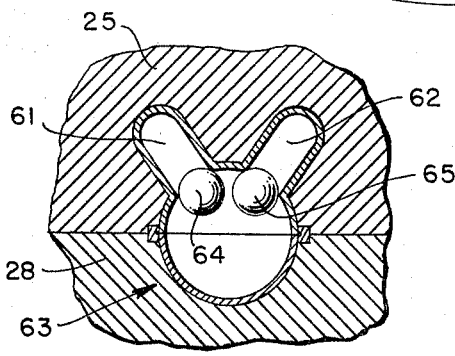
FIG. 9 is a partial vertical cross-section view of a modified secondary head.

While the foregoing description is directed to a preferred embodiment of the device, it is to be particularly noted that where a combination of three materials or propellant ingredients are to be evaluated, the primary head 25 may be provided with a pair of secondary chambers 61 and 62, FIG. 9, communicating with a primary chamber 63 and having a seal operatively established between the three chambers by a pair of ferromagnetic sealing elements or balls 64 and 65 seated in a sealing relationship therewith. The charging and firing operation may be carried out in a manner similar to that hereinbefore described.

In view of the foregoing description it is readily apparent that the device of the instant invention provides a simple economic, and safe device for obtaining pressure data for evaluating advanced propellants.

Obviously many modifications and variations of the present invention are possible in the light of the above teachings. It is therefore to be understood that within the scope of the appended claims the invention may be practiced otherwise than as specifically described.

What is claimed is:

1. A hybrid propellant test system for evaluating bipropellant ingredients, comprising in combination:
   a pair of mated and pressure sealed heads comprising a primary head and a secondary head, including means defining therein a spherical primary chamber and a vertically disposed, closed-end tubular secondary chamber terminating in operative communication with said primary chamber through a normally open port formed at one end of said secondary chamber;
   a spherical member formed of ferromagnetic material disposed within said primary chamber adapted to be seated in a contiguous relationship with the surfaces of said port to close the port and establish a seal between the chambers, and to be displaced therefrom for opening said port;
   a housing including means defining a pair of horizontally supported shafts fixed to opposite sides thereof for accommodating end-to-end inversion of said housing;
   means securing said pair of heads to one end of said housing with the secondary chamber being disposed between the housing and the primary chamber, whereby said secondary chamber may be inverted from an upwardly opening disposition to a downwardly opening disposition through an inversion of said housing;
   an electrical source-connected electromagnet fixed within said housing operatively energized through an imposed electrical charge for establishing magnetic field having a density adjacent said port sufficient for retaining said spherical member against displacement and in a seated relationship with respect to the surfaces of said port when said secondary chamber is in a downwardly opening disposition, and to be de-energized for releasing said spherical member for gravity induced displacement to thus open said port;
   coupling means releasably connecting said heads in a pressure sealed and mated disposition, whereby said heads may be separated for accommodating an insertion of a bipropellant ingredient within said secondary chamber and a sealing of the chamber by disposing the spherical member in a seated relationship with said port when said housing is inverted to dispose the secondary chamber in an upwardly opening disposition;
   a liquid propellant ingredient charging system connected with said primary chamber for charging said primary chamber with a second bipropellant ingredient when said electromagnet is energized and said spherical member is retained in its seated disposition;

electrical circuit switch, connected between said electromagnet and said source, selectively operable for de-energizing said electromagnet for thus releasing said spherical member to open said port so that propellant ingredients contained in said chambers may be caused to contact each other for initiating an ignition thereof; and transducer means mounted in one head of said pair of heads communicating with said primary chamber for monitoring pressures established through an initiated ignition of said propellant ingredients.

2. The device of claim 1 further characterized in that said liquid propellant charging system comprises a thermal siphon system, including:

a charging conduit extending between said primary chamber and the exterior surface of said primary head;

a needle-valve operatively associated with said conduit and adapted for selectively opening and sealing said conduit adjacent said primary chamber;

a liquid propellant ingredient ampule receptacle fixed relative to said primary head for receiving an ampule of liquid propellant ingredient therein;

a heating unit arranged adjacent said receptacle for heating the received ampule and converting the ingredient to a gas;

gas conducting means connecting said charging conduit with said receptacle, whereby said propellant ingredient may be passed as a gas from the ampule to the primary chamber; and a cooling unit disposed adjacent said primary chamber for cooling and converting said propellant ingredient from a gas to a liquid within said primary chamber.

3. In the device of claim 2, means further comprising:

an exhaust-purge conduit extending between the exterior surface of said secondary head and said primary chamber;

means including a needle-valve operatively mounted adjacent said exhaust-purge conduit for selectively sealing said conduit adjacent said primary chamber; and means mounted on said secondary head for coupling said conduit with an inert gas exhaust-purge complex.

4. The device as defined in claim 3 further characterized in that each of the chambers is provided with a highly polished and removable surface liner.

5. In a device for evaluating a bipropellant, means comprising:

a primary chamber containing a first propellant ingredient;

a secondary chamber surmounting said primary chamber containing a second propellant ingredient;

means defining a generally vertically aligned conduit connecting said chambers for affording a passage of said second ingredient from said secondary chamber into said primary chamber;

a ferromagnetic sealing member arranged within a portion of said conduit and adapted to be selectively disposed in a seated disposition and retained therein under the influence of a magnetic field acting directly thereon for establishing an ingredient obstructing seal between said chambers; and a selectively energizable means disposed adjacent said secondary chamber operatively energizable for establishing a magnetic field within said conduit for selectively retaining said sealing member in a seated disposition within said conduit, and deenergizable to permit said sealing member to drop into said primary chamber to agitate said first propellant ingredient.

6. The device of claim 5 further comprising:

means defining a second secondary chamber containing a third propellant ingredient;

a second generally vertically aligned conduit for connecting said second secondary chamber and said primary chamber for passing said third ingredient into said primary chamber; and a second ferromagnetic sealing member disposed in said second conduit adapted to seat therein for establishing a second ingredient obstructing seal between said second secondary chamber and said primary chamber.

7. A device as in claim 5 in which said sealing member is a ball.

References Cited by the Applicant

UNITED STATES PATENTS

| | | |
|---|---|---|
| 2,730,893 | 1/1956 | Hayward et al. |
| 2,937,519 | 5/1960 | Brace et al. |
| 2,972,247 | 2/1961 | Zablacki. |
| 2,983,135 | 5/1961 | Zihlman. |

RICHARD C. QUEISSER, *Primary Examiner.*